March 10, 1970 M. J. TOLEGIAN 3,500,082
DRIVE UNIT FOR FLEXIBLE SHAFTS
Filed Aug. 15, 1967 3 Sheets-Sheet 1
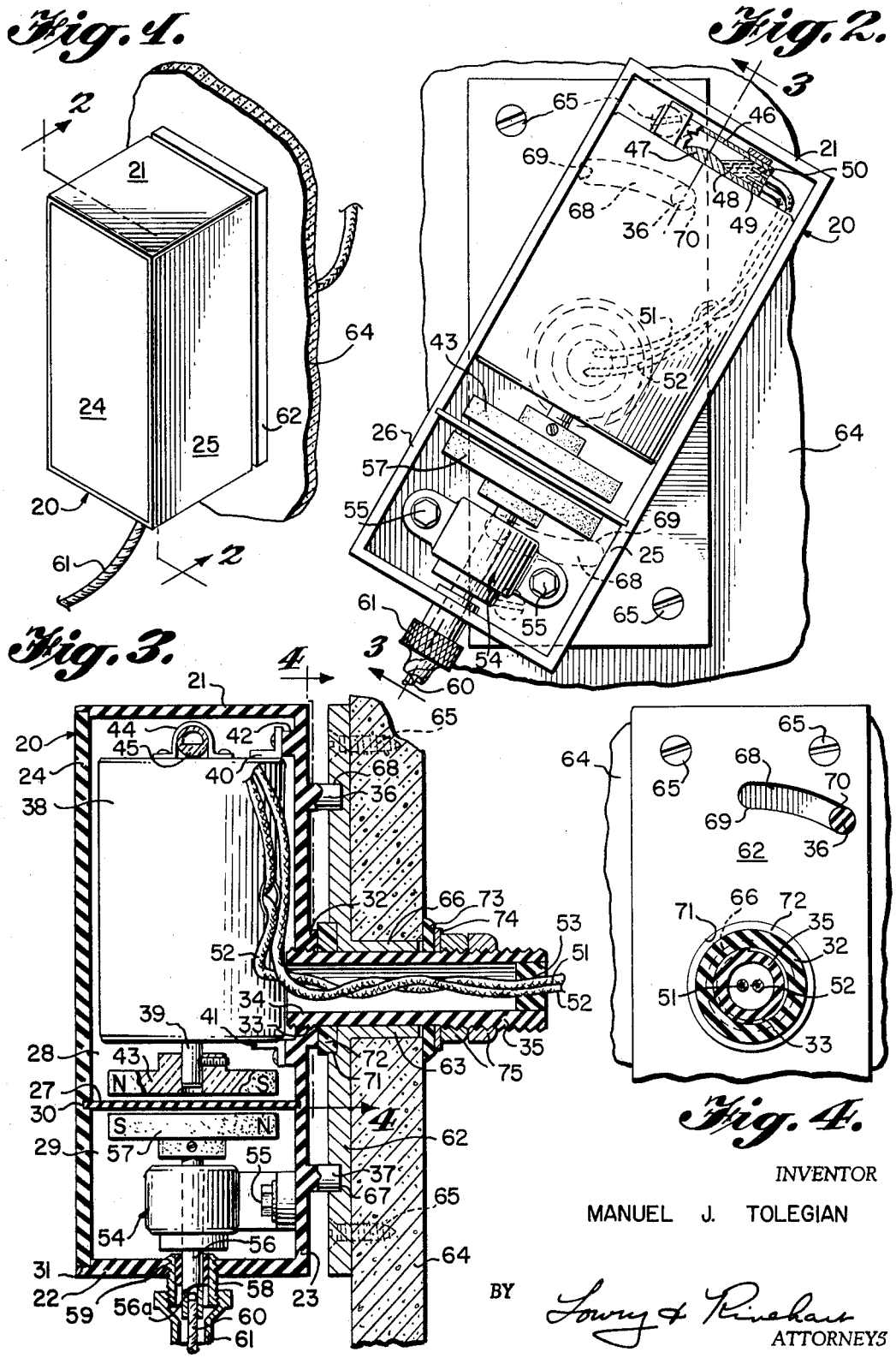
INVENTOR
MANUEL J. TOLEGIAN
BY Lowry & Rinehart
ATTORNEYS

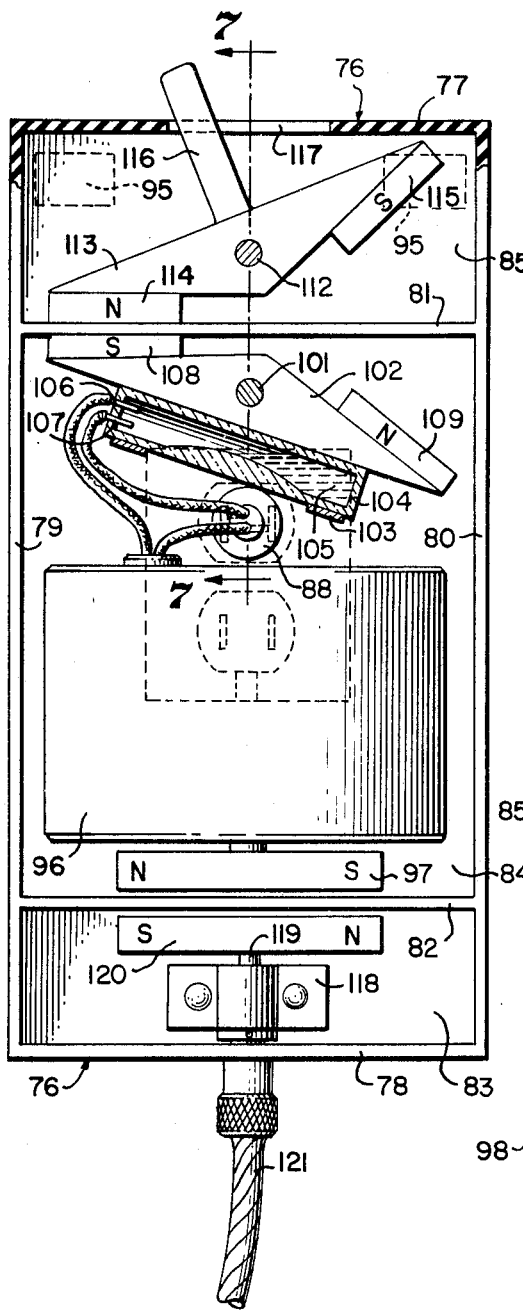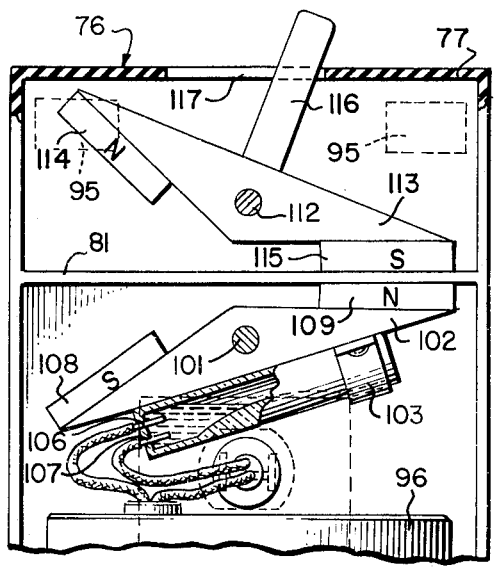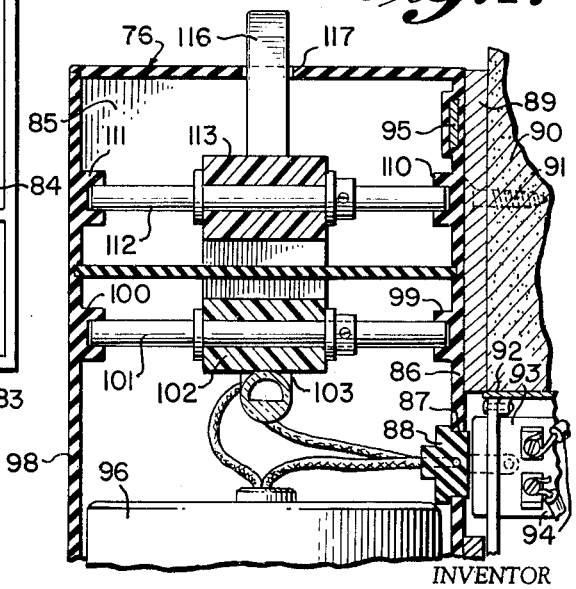

March 10, 1970 — M. J. TOLEGIAN — 3,500,082

DRIVE UNIT FOR FLEXIBLE SHAFTS

Filed Aug. 15, 1967 — 3 Sheets-Sheet 3

INVENTOR
MANUEL J. TOLEGIAN

BY Lowry & Rinehart
ATTORNEYS

United States Patent Office 3,500,082
Patented Mar. 10, 1970

3,500,082
DRIVE UNIT FOR FLEXIBLE SHAFTS
Manuel J. Tolegian, Los Angeles, Calif.
(3960 Glenridge Drive, Sherman Oaks, Calif. 91403)
Filed Aug. 15, 1967, Ser. No. 660,729
Int. Cl. H02k 7/14
U.S. Cl. 310—50                                          14 Claims

ABSTRACT OF THE DISCLOSURE

A drive unit for flexible shafts which has a hermetically sealed, electrically isolated and fluid isolated electrical drive and switching system. An electric drive motor and control switches are housed in a hermetically sealed chamber, or in a chamber wherein appropriate seals prevent the entrance of any fluids. The torque is transmitted from the motor to the flexible drive shaft by a magnetic drive wherein the drive magnets are separated by dielectric means. This may be by an air gap, by a diaphragm of dielectric material, or ceramic magnets may be used, the dielectric qualities of the magnets providing electrical isolation. The control switch for the electric motor is located completely within the sealed housing. Actuation of the switch is accomplished either by tilting the housing, or by magnetic couplings wherein the switch arm as moved by the hands of the operator is completely isolated from the electrical portion of the switching system. This drive unit has particular utility where a flexible drive shaft is to be operated in an environment having present large quantities of water, water vapor, or chemically active or explosive gases. Personnel using the appliance are protected against shock hazards due to dielectric breakdown in the electrical system, and fluids such as water, water vapor and chemically active and explosive gases are prevented from entering the electrical system. In addition to the broad concepts involved, the structure presents certain modifications in the details of handling the electrical drive and the switching systems.

RELATED INVENTIONS AND PATENTS

The present invention is generally related to magnetic coupling drives disclosed and claimed in my U.S. Patent 3,113,228, entitled Magnetic Electrical Coupling and Applications Thereof, issued Dec. 3, 1963, and my Patent 3,114,527, entitled Magnetic Electric Coupling, issued on Aug. 11, 1964. Patent 3,113,228 relates to magnetic coupling drives for operating turntables and shafts in sound equipment and allied machines in which silence of operating and absence of vibration are critical factors. Patent 3,114,527 relates to electrical connectors, plugs and receptacles which are operated by means of ceramic magnets and in which the remote operation and the automatic alignment of the connectors, plugs and receptacles are the primary objects of the invention disclosed and claimed. The present invention presents certain new and useful improvements in magnetic coupling drives and extends the use of magnetic couplings into drive units for flexible shafts.

BACKGROUND OF THE INVENTION

Flexible drive shafts have a wide variety of uses and are found in a wide variety of environments. They are used in the home for actuating electrical appliances such as blenders, garbage disposers, kitchen food mixers, and the like. They are used in the bathroom for electrically powered toothbrushes, massage and shower appliances, and motorized water baths. Flexible shafts are also applied to certain outdoor tools, certain home workshop appliances, and certain craft and hobby devices. Flexible shafts are also widely used in industrial applications, such as on assembly lines wherein various operations are being performed on work on the assembly line, in food processing plants, and plants directed to the processing and finishing of hides and skins, these being only a few examples of numerous applications.

In many of these applications, persons using the flexible shaft are either working in water or other fluids, or are operating with wet hands or in processing rooms wherein water is continually flooding the floor areas. In the bathroom, particularly, the appliances are being used in the presence of free water, or heavy water vapors, and the operators are using water faucets or the like which are directly grounded to the extent wherein very heavy current may be taken by the body from a malfunctioning electrical appliance.

In using electrical appliances, and specifically flexible drive shafts, in such a hostile environment, there has in the past been extreme shock hazard to the person using the devices. Failure of switches or the shorting of motor windings will supply a heavy charge of electrical current to the casing or tools being used in connection with the flexible drive shaft, and in the event the body of the user is grounded by water, plumbing systems or the like, severe electrical burns or even electrocution may occur. Many of the devices involved cannot have grounding circuits applied without expensive and major redesign of the entire electrical systems. The devices are very often plugged in and used where third wire grounding systems would normally not be installed. If the flexible drive shafts are used directly in water, or in the presence of water or large quantities of water vapor, water may work into the electrical system and cause dangerous and undesirable shorting of the system such as to cause physical harm to the user.

In addition, flexible shafts are very often used in hospitals or medical laboratories where explosive vapors may be present, or in industrial plants where corrosive fluids and gases may be found. Prior drive units for flexible shafts have presented a substantial hazard, since they were not protected against the infiltration of explosive gases which might be ignited by sparking within the electrical system. Further, the devices have not been protected against the damage which occurs in the presence of corrosive fluids in industrial processes.

There has been a substantial failure, in the prior art, to provide a drive unit for flexible shafts which will present optimum protection against electrical burns or electrocution, and which will permit the devices to be used freely in a wide variety of applications without fear of harm to the user.

SUMMARY OF THE INVENTION

It is an object of the invention to overcome the difficulties and limitations found in previously known drive units for flexible shafts. The drive unit of the invention may be used in any environment, no matter how hostile, with complete safety to any person using or in contact with the device.

It is an object of the invention to provide a drive unit which may be used directly in water, or in the presence of large quantities of free water or water vapor with complete safety to the operator, irrespective of an electrical breakdown in the electrical drive motor or switching system in the drive unit.

It is an object of the invention to provide positive and complete protection from electrical shock hazard, to provide a drive unit wherein water, water vapor, and corrosive fluids or gases may not enter into the electrical system, the motor drive and switching system being completely isolated from those portions of the structure handled by the operator in switching the drive unit on or off in using the appliance driven by the flexible shaft.

3

It is an object of the invention to provide a drive unit having switching means in which it is impossible for shorting or malfunction of the switch to transmit electrical current to the operator, and in which the working end of the flexible shaft is isolated from any and all stray electrical currents which may emanate from the motor, its wiring, or from improper and poor grounding.

It is a further object of the invention to provide an improved switching means for a drive unit for flexible shafts, wherein the switching means is completely sealed and isolated within a protecting housing, and wherein the switch may be automatically actuated by tipping or tilting the casing housing the drive unit.

Still another object of the invention is to provide a drive unit for flexible shafts wherein, in the event the flexible shaft is overloaded, the reverse torque load on the flexible shaft core will not be sufficiently great to cause the shaft core to be broken, twisted or otherwise damaged. In the event of corrosion or freezing of the flexible shaft, the structure of the present invention prevents damage or stalling of the drive motor and burn-out of the motor, which might otherwise occur.

It is an object of the invention to utilize the electrically non-conductive properties inherent in ceramic magnets while simultaneously utilizing the benefits of the magnetic properties of such magnets.

Still another object of the invention is the provision of a magnetic coupling in a drive unit which operates effectively whether or not the drive shafts are accurately aligned, thus reducing the need for highly expensive and close manufacturing tolerances.

It is still another object of the invention to provide a drive unit for flexible shafts which may be easily mounted on a standard electrical outlet socket designed for the reception of a standard two-pronged outlet plug.

Still another object of the invention is to provide a drive unit having various improved switching means providing improved electrical isolation between the electrical system and the hands of the operator.

Another object of the invention is to provide a drive unit wherein the drive switch will be automatically operated when tension is placed on the flexible shaft casing sufficient to cause a tilting of the housing of the drive unit.

DESCRIPTION OF THE DRAWING

FIGURE 1 is a fragmentary isometric view of preferred embodiment of the drive unit as mounted for use on a supporting wall.

FIGURE 2 is a front elevation of the drive unit, wall mounted, with the closure cover removed to clearly show the electrical and structural components, and with the unit tilted on its supporting plate to close the motor switch.

FIGURE 3 is a longitudinal section view taken on the line 3—3 of FIGURE 2 and showing details of the wall mounting of the unit.

FIGURE 4 is a fragmentary sectional view taken on the line 4—4 of FIGURE 3, and showing details of the mounting plate and the pin and slot stop means for positioning the casing of the drive unit.

FIGURE 5 is a front elevational view of a modification of the drive unit as adapted for direct mounting on a standard wall outlet receptacle with the cover removed to show the electrical and structural components.

FIGURE 6 is a fragmentary front elevational view of the unit of FIGURE 5, showing the switching mechanism at "On" position as opposed to the "Off" position shown in FIGURE 5.

FIGURE 7 is a fragmentary lognitudinal section taken on the line 7—7 of FIGURE 5.

DESCRIPTION OF THE PREFERRED EMBODIMENTS

Embodiment of FIGURES 1-4

Figure 8:
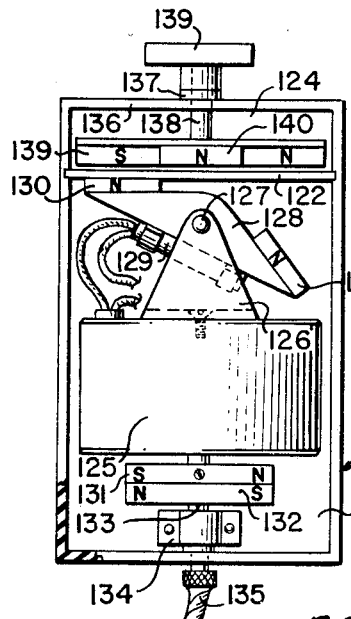
FIGURE 8 is a front elevational view, cover removed, of still another modification of the invention wherein ceramic magnets forming a magnetic coupling are in direct drive contact, and showing an alternate modification of switching structure.

The preferred embodiment of the invention is shown in FIGURES 1 through 4 of the drawing. The reference numeral 20 indicates the housing for the drive unit of the present invention. This housing is rectangular and is defined by the top wall 21, the bottom wall 22, the rear wall 23, the side walls 25 and 26, and the front wall or cover plate 24. A partition 27 divides the housing into an upper compartment 28 and a lower compartment 29.

The housing 20, including the partition 27, is preferably made of high impact, synthetic plastic material having a very high dielectric constant and, therefore, of excellent insulating qualities. The partition 27 is preferably set in a groove 30 extending around the interior of the casing, and the joint is desirably heat or solvent sealed so that it will be completely impervious to the passage of moisture or gases. The cover 24 is inset in a groove 31 in the marginal edge defined by the top and bottom walls 21 and 22 and side walls 25 and 26. This cover is likewise preferably heat or solvent sealed so that the housing will be, at these joints, completely impervious to moisture and gases. It will be readily understood that the cover 24 may, if desired, be secured with fasteners, and an appropriate seal may be used so that the casing will be pressure sealed when the fastenings are in place.

The back wall 23 of the casing is provided with a boss 32 which has internal threads 33 designed to receive the threaded inner end 34 of a pipe nipple 35 which is preferably made of the same high impact, synthetic plastic material as the casing 10. Also on the back wall of the casing and projecting outwardly therefrom is an upper stop pin and a lower stop pin 37. These pins are preferably integrally formed of the same material as the casing and have a purpose which will later be described in greater detail.

In the upper compartment 28 of the casing is positioned an electric motor 38 which has a downwardly and outwardly directed drive shaft 39. The motor 38 is fastened in the casing by means of brackets 40 and 41 which are welded or soldered to the casing of the motor, the brackets being fastened to suitably formed projections 42 on the back wall of the casing.

On the shaft 39 is positioned a round disc magnet 43 which is preferably of ceramic material having very high magnetic strength but of excellent dielectric qualities.

Secured to the upper end of motor 38 by a bracket 44 is a mercury tilt switch 45 of well known construction. This tilt switch comprises a sealed hollow casing 46, having a hump 47 substantially at the midpoint of the tube or casing. In the switch tube is placed a pool of mercury 48 which is substantially less in volume than the total volume of the switch tube. Projecting through one end of the sealed tube are spaced electrode terminals 49 and 50. These terminals are of exposed conductive metal which at the point where they pass through the switch tube are firmly sealed to the tube. When the switch tube is tilted, as shown in FIGURE 2, the mercury pool 48 runs to the end of the tube containing the electrodes 49 and 50, bridging the electrodes and causing the closing of the electrical circuit.

Electric conduits 51 and 52 enter through the pipe nipple 35, as shown in FIGURE 3. The conduit 52 extends into the windings of the motor and then proceeds to the electrode 49 of the mercury switch. The conduit 51 carries current directly to the electrode terminal 50. Accordingly, the electrical conduits 51 and 52 provide a current source for the motor, which current source is switched on or off by means of the tilt switch 45. A seal 53 which closely engages and surrounds the electrical conduits 51 and 52 is preferably provided to prevent moisture from entering the outer end of the pipe nipple 35.

The lower compartment 29 contains a pillow block 54 which is fastened to the walls of the housing by fasteners 55. This pillow block provides a journal for a rotatable stub shaft 56. This shaft 56 is provided at its upper end with a round ceramic magnet 57 which is securely fixed to the shaft. This ceramic magnet is preferably of generally the same size and shape as the disc magnet 43 in the upper compartment 28. The lower end 56a of the stub shaft extends through a short sleeve 58 and shaft seal 59, the short sleeve 58 being in threaded engagement with the bottom wall 22 of the casing to provide a fluid-proof seal. The lower end 56a of the stub shaft is likewise connected to a flexible drive cable or core 60 which extends to the appliance in the usual manner. The cable or core is housed in a tubular casing 61, and a threaded end of this casing is engaged with the threaded lower end of the short sleeve 58.

The housing 20 is mounted on a base plate 62, which may be of any suitable material, but which is preferably made of relatively strong metal. The base plate has a bearing sleeve 63 which is sized to snugly receive the pipe nipple 35, as shown in FIGURE 3. The base plate 62 is secured to a wall surface 64 by fastenings 65, and the bearing sleeve 63 projects through an opening 66 in the wall surface 64. It will be noted that the outer surface of the base plate is provided with arcuate grooves 67 and 68, which grooves receive the stop pins 36 and 37 of the casing. One end 69 of each groove 68 is substantially on a vertical line extending through the longitudinal axis of the casing, and when the casing 20 is tilted in a counter-clockwise direction, or toward the vertical position, the stop pins will hit the casing wall at the end 69 of the groove 68 and arrest movement of the casing in exactly vertical position. On the other hand, when the casing is tilted in a clockwise direction, as shown in FIGURE 2, the stop pins will hit the end wall defined by the end 70 of each groove and the movement of the casing will be arrested in a tilted position sufficient to cause the pool of mercury 48 to bridge the electrodes 49 and 50. Further movement of the casing, which would be undesirable, is prevented.

In securing the housing 20 to the base plate 62 and the wall 64, the base plate is provided with an annular recess 71 which receives a sealing washer 72, made of Teflon or any other tough material having very low friction characteristics. On the opposite side of the wall 64 is placed a sealing washer 73, likewise of Teflon or similar low friction material. A wear washer 74 is placed outside of the sealing washer 73, and lock nuts 75 are placed on the threaded end of the pipe nipple. By this arrangement, the lock nuts 75 are drawn up until sufficient pressure is placed on the assembly to cause a tight seal at the threads 33 leading into the housing 20 and also leading into the bearing surface between the pipe nipple 35 and the bearing sleeve 63. The sealing washer 73 will prevent moisture or any other fluid from entering the opposite end of the bearing. When this desired pressure has been reached, the lock nuts 75 are locked one relative to the other, and because of the low friction characteristics of the Teflon washers 72 and 73, the housing may pivot on the pipe nipple but sufficient friction exists to hold the housing in whatever position it may be placed. By this arrangement, any liquids, such as water, water vapor or gases, are prevented from entering the housing 20, the pipe nipple 35, or the bearing surface in the bearing sleeve 63.

In the operation of this embodiment, it will be seen that the drive unit may be installed by securely fastening the base plate 62 to the wall and by connecting leads 51 and 52 to a suitable wiring outlet or box receptacle, and the housing will normally occupy the position shown in FIGURE 1. When the appliance at the end of the casing 61 and flexible drive cable 60 is to be used, it is only necessary to pull on the tubular casing 61 to tilt the housing 20 in the bearing sleeve 63 to the position shown in FIGURE 2, where the stop pins 36 will engage the ends 70 of grooves 68. The mercury pool 48 will roll over the hump 47 in switch casing tube 46 and bridge the electrodes 49 and 50. This will close the circuit to the motor 38 and drive the ceramic disc magnet 43. The torque created by rotation of the magnet 43 will be transmitted to the opposed magnet 57, which in turn will drive the stub shaft 56 and the flexible drive core 60.

The electric motor, switching system and current supply are hermetically sealed within the compartment 28 of housing 20 and the pipe nipple 35. It is impossible for liquids or gases to enter into the compartment 28 of the housing and to short out the electrical system or cause corrosion. Conversely, if a short circuit should occur in the motor 38, the switching system, or the wiring leading into the housing 20, any grounded electrical energy is prevented from being transmitted to the drive cable 60 and hence to the user of the appliance. Thus, the device may be used in or near water, in the presence of large quantities of water vapor, and in rooms having explosive vapors or the like, without any possibility of danger to personnel using the device. The ceramic magnets 43 and 57, which have good dielectric qualities, and the partition 27, effectively prevent discharge or transfer of any surge of grounded electrical energy.

Modification of FIGURES 5–7

FIGURES 5, 6 and 7 of the drawing show another modification of the drive unit in which the unit may be mounted directly over a standard outlet receptacle without special installation procedures, and wherein a manually operated switch actuator is provided for switching rather than automatic switching by tilting of the casing structure, as in the previous modification. The housing 76 is provided with a top wall 77, a bottom wall 78, and side walls 79 and 80. This modification is likewise provided with a cover 98. The housing 76 is provided with partitions 81 and 82 which divide the housing into compartments 83, 84 and 85, respectively. The partitions 81 and 82 are sealed to the casing by solvent or heat so that they are fluid impervious. The casing is provided with a back wall 86, this wall having an opening 87 which receives the body portion 88 of a male electrical plug. This plug is preferably of the same synthetic plastic material which forms the housing 76 and is sealed to the edges of the opening 87 by heat or solvent. The plug is also of the type wherein the plug body is molded around the electrical components so that there is a hermetic seal between the plug and casing. A base plate 89 of ferrous material is secured to the wall 90 by means of fasteners 91. This base plate is designed to take the place of the standard outlet plate which normally is positioned over a standard outlet box 92. The outlet box 92 houses a female receptacle 93 which receives the leads 94 of a wiring circuit. Molded into the back wall 86 of the housing 76 are one or more magnets 95 of very high strength magnetic material. When the male prongs of the plug 88 are placed in the receptacle 93, the magnets 95 securely attach the housing to the ferrous plate 89, and the housing is held securely in place without strain being placed on the electrical connection. The close fit of the housing against plate 89 likewise prevents water or water vapor from entering the receptacle.

The compartment 84 houses an electric drive motor 96, the drive shaft of which carries a disc shaped ceramic magnetic 97. In the compartment 84 above the motor 96 the back wall 86 is provided with a bearing boss 99 and the cover 98 is provided with a bearing boss 100. Journalled in these bosses is a shaft 101 which has a switch rocker arm 102 securely fixed thereto. The switch rocker arm has secured to the lower face thereof, by the straps 103, a sealed mercury switch tube 104, similar to that used in the first embodiment. This tube has a mercury pool 105 and electrodes 106 and 107 which enter the end of the tube. The motor and switch are wired in a circuit similar to that described for the modification of FIGURE 1. The outer ends of the switch rocker arms carry high strength magnets 108 and 109, respectively. In the compartment 85 the back wall 86 and cover 98 are provided respectively with bearing bosses 110 and 111. In these bearing bosses are journalled the ends of a shaft 112, upon which is fixedly secured a switch actuator rocker arm 113, similar in size and shape to rocker arm 102 in compartment 84. This rocker arm has mounted thereon magnets 114 and 115. The magnet pairs 108–114 and 109–115 are of opposite polarity so that when the magnets are brought close one to the other, the magnetic elements will be attracted to each other rather than repelled. The switch actuator rocker arm 113 is provided with an arm 116 which projects through an opening 117 in the top wall 77 of the housing.

In compartment 83 there is fastened a pillow block 118, which provides a bearing for a stub shaft 119. This stub shaft 119 is fixedly connected to a disc shaped ceramic magnet 120 and its opposite end is connected to the shaft core in the flexible shaft housing 121.

In installing the drive unit of this modification, the standard cover plate of the receptacle or outlet box is removed, and the ferrous metal plate 89 is fastened to the wall with the opening in the plate placed over the receptacle 93. The male prongs on the plug 88 are then plugged into the receptacle, and the magnets 95 secure the housing 76 to the ferrous metal plate 89.

If the unit is to be deactivated, the arm 116 is forced in a counter-clockwise direction by hand until the arm is approximately the vertical or neutral position. The magnet 115 has been drawn away from the partition 81, and as a result the arm 102 drops in a pendulum type movement to reach equilibrium in horizontal position within the compartment 84. The arm 116 is then further moved in a counter-clockwise direction until the magnet 114 is against the partition 81. Magnet 114 then being closer to magnet 108 than magnet 115 is to magnet 109, magnet 108 will be drawn upwardly by magnetic force against the partition 81, as shown in FIGURE 5. The mercury pool moves to the opposite end of mercury switch tube 104, away from the electrodes 106–107, and the circuit is broken. The reverse procedure is followed to energize the motor, the handle 116 first being moved to a neutral position until the arm 102 stabilizes and then being moved to a full clockwise position to cause the mercury pool to move to bridge the electrodes.

In this form of the invention, it will again be noted that the motor 96, the switching system and the electrical supply circuit are hermetically sealed within the compartment 84. The casing of dielectric material, the partitions 81 and 82, and the magnets, both for operating the switch rocker arm and the cable drive shaft, 119, provide isolation of the electrical components so that the operator at no time may receive grounded electrical discharge.

Figure 9:
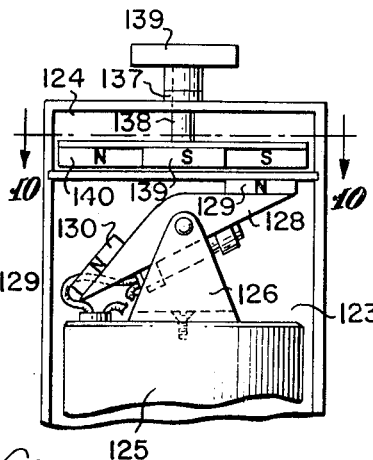
FIGURE 9 is a fragmentary front elevational view, cover removed, of the modification of FIGURE 8, with the switch at "On" position as contrasted with the "Off" position shown in FIGURE 8.
Figure 10:
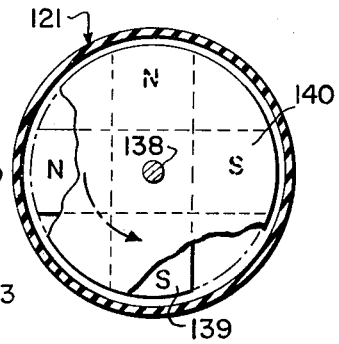
FIGURE 10 is a cross-sectional view taken on the line 10—10 of FIGURE 9, showing the arrangement of the magnets and the switching means.

Modification of FIGURES 8–10

In the structure of FIGURES 8, 9 and 10 is shown a modification both as to the magnetic switch actuator and as to the use of ceramic magnets in direct contact, which by their dielectric properties maintain electrical isolation of the flexible cable and drive shaft from the motor and switching system.

The casing 21 is provided with a partition 122 which separates the said casing into a lower compartment 123 and an upper compartment 124. In the compartment 123 is a motor 125 having pivot brackets 126 secured thereto. Pivot brackets 126 have a pin 127, upon which is pivotally mounted the switch rocker arm 128. The switch rocker arm carries a mercury tilt switch 129 similar to that used in the previously disclosed structures. At opposite ends of the switch rocker arm 128 are magnets 129 and 130, these magnets being of the same polarity, in this case indicated as north. The motor shaft has a disc shaped ceramic magnet 131 fixed thereto, which ceramic magnet is in direct physical contact with a corresponding ceramic magnet 132 on the stub shaft 133. This stub shaft is journalled in the pillow block 134 and is connected at its outer end to the core of a flexible shaft, the housing therefor being shown as 135.

The upper end 136 of the casing is provided with a journal boss 137 in which is rotatably mounted a stub shaft 138. This stub shaft is turned by a thumb knob 139 which is fixed to the shaft. Fixedly secured to the lower end of the stub shaft 138 are crossed magnets 139 and 140. In this arrangement, it will be noted that the poles of each magnet are on opposite sides of the stub shaft 138, the zero and nine o'clock positions being of the same polarity, or north, and the three and six o'clock positions being of the same polarity, or south.

In describing the operation of the modification of FIGURES 8–10, reference is made to FIGURE 8 in which the switch is shown in "Off" position. A south pole of magnet 139 is positioned over the magnet 130 on the switch rocker arm 138, this having been accomplished by twisting the knob 139 to rotate the magnet couple to that position. The polarity of the magnet 139 being opposite to the polarity of magnet 130, the magnet 130 will be attracted to a rest position against the partition 122. The switch 129 is therefore tilted to an "Off" position. At the same time, the opposite end of magnet 139, being north and opposite in polarity to the north polarity of magnet 129, will tend to force the switch rocker arm down in a clockwise direction. Both magnets, therefore, combine to drive the switch to the "Off" position as shown in FIGURE 8.

If the switch is to be turned to the "On" position, the knob is rotated clockwise 90 degrees until magnet 140 is in alignment with magnet 128, with the north pole of magnet 140 overlying magnet 130. Since the polarity of the two opposed magnets is now the same, the magnet 130 will be repelled to tilt the rocker arm, and since the south pole is now over north magnet 129, the magnet 129 will be attracted upwardly against the partition 122. The switch rocker arm will then be in the position shown in FIGURE 9, and the mercury pool will bridge the electrodes to close the energy circuit to the motor 125.

Modification of FIGURES 11–14

In FIGURES 11–14 is shown still another modification of switch actuating structure. A casing 141 is divided by the partition 142 into a lower compartment 143 and an upper compartment 144. In the lower compartment is provided a previously described structure of switch rocker arm 145, mercury switch 146 and magnets 147 and 148 on the switch rocker arm. The upper end of the compartment 144 is open, but adjacent the side marginal edges thereof are provided slide grooves 149 and 150, respectively. In these grooves is positioned, for slidable movement, a slide plate 151. This slide plate 151 may be moved from the full line position shown at the right hand side of FIGURE 14 to a position shown in phantom at the left side in FIGURE 14. Slide plate 151 carries a finger piece 152, the lower end of the finger piece having attached thereto a very strong manget 153.

Figure 11:
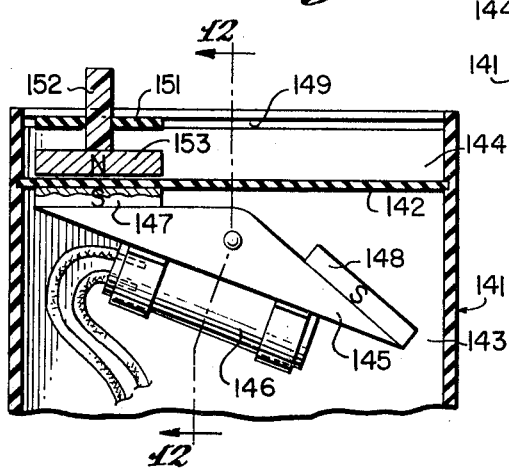
FIGURE 11 is a fragmentary longitudinal sectional view showing a modified form of switching construction, with the switch at the "Off" position.
Figure 13:
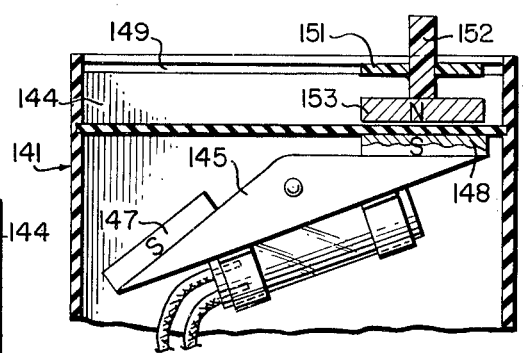
FIGURE 13 is a fragmentary longitudinal sectional view of the switch construction shown in FIGURE 11, with the switch at the "On" position.
Figure 12:
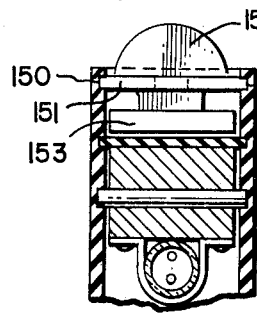
FIGURE 12 is a fragmentary longitudinal sectional view taken on the line 12—12 of FIGURE 11.
Figure 14:
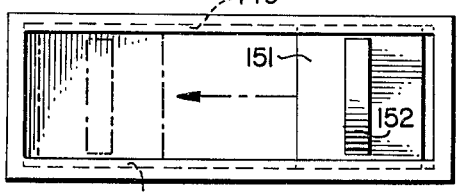
FIGURE 14 is a top plan view of the switching construction shown in FIGURE 11.

As to the operation of this modification, FIGURES 11 and 13 illustrate the "Off" and "On" positions, respectively. When the slide plate 151 is moved to the extreme left, the magnet 153 is carried to the position shown in FIGURE 11. The polarity of the magnet 153 being north, or opposite to that of magnet 147, magnet 147 will be attracted to a position against the partition 142, and this will cause the mercury switch 146 to tilt to the "Off" position. Conversely, if the slide plate 151 is moved to the far right position, as shown in FIGURE 13, the north pole of magnet 153 will attract the south pole of magnet 148, tilting the switch rocker arm to the position shown in FIGURE 13, and closing the switch to energize the motor.

Again, it will be observed that the motor, switching system and current supply are in a sealed compartment 143. The switch operating means, namely the finger piece 152, is electrically isolated from the electrical system by means of the ceramic magnets 147 and 153 and the partition 142. The flexible drive core and its casing will be electrically isolated by the ceramic disc magnets, and any dielectric partition between the magnets.

What is claimed is:

1. A drive unit for a power take-off means, comprising
    (a) a housing having a hermetically sealed compartment means of dielectric material, said compartment means being impervious to fluids;
    (b) an electric drive motor in said sealed compartment means;
    (c) an electric current supply means leading from outside of said compartment means to said motor;
    (d) a switching means electrically and mechanically isolated within said compartment means for interrupting said current supply means to said motor for selectively energizing or deenergizing said motor;
    (e) a drive magnet means in said compartment mounted on the drive shaft of said motor;
    (f) a driven magnet means and a driven shaft outside of said sealed compartment, said driven magnet being adjacent to but electrically and mechanically isolated from said drive magnet means for the transfer of torque by magnetic force without the transfer of electrical current or fluids; and
    (g) a power take-off means operatively connected to said driven shaft.

2. A drive unit for a power take-off means, comprising
    (a) a housing having a hermetically sealed compartment means of dielectric material, said compartment being impervious to fluids;
    (b) an electric drive motor in said sealed compartment means;
    (c) an electric current supply means leading from outside of said compartment means to said motor;
    (d) a switching means electrically and mechanically isolated within said compartment means for interrupting said current supply means to said motor for selectively energizing or deenergizing said motor;
    (e) a drive magnet means in said compartment mounted on the drive shaft of said motor;
    (f) a driven magnet means and a driven shaft outside of said sealed compartment, said driven magnet means being adjacent to but electrically and mechanically isolated from said drive magnet means for the transfer of torque by magnetic force without the transfer of electrical current or fluids;
    (g) power take-off means operatively connected to said driven shaft;
    (h) said switching means including a tilt operated electrical switch; and
    (i) said housing having a support means for tilting said housing to selectively activate said switch.

3. A drive unit as set forth in claim 2;
said support means including a base plate, a bearing opening in said plate, and a pivot projection on said housing journaled in said bearing opening.

4. A drive unit as set forth in claim 2;
said support means including a base plate, a bearing opening in said plate, and a tubular projection on said housing journaled in said bearing opening;
said electric current supply means entering said compartment means through said tubular projection.

5. A drive unit as set forth in claim 2;
said support means including stop means for limiting the movement of said housing between normal and tilted positions.

6. A drive unit as set forth in claim 2;
said support means including a base plate, a bearing sleeve in said plate, a tubular projection on said housing journaled for rotation in said bearing sleeve, a bearing seal between said housing and said plate, a bearing seal on the outer end of said sleeve for clamping said drive unit in place in a wall opening, said electric current supply means entering said compartment means through said tubular projection.

7. A drive unit as set forth in claim 1;
said switching means in said compartment carrying a magnet means;
a switch operated outside of said compartment and secured to said housing carrying a separate magnet means movable into sufficient proximity to said switch magnet means or sufficiently away from said switch magnet means to selectively actuate and deactuate said switching means.

8. A drive unit as set forth in claim 1;
the portion of said electric current supply means outside of said compartment means comprising a pair of male plug electrodes adapted to fit the female socket of a standard electrical receptacle.

9. A drive unit as set forth in claim 1;
the portion of said electric current supply means outside of said compartment means comprising a plug on the wall of said compartment means having a pair of male plug electrodes adapted to fit the female sockets of a standard electrical receptacle;
a base plate secured over said receptacle; and
means to secure said housing to said base plate.

10. A drive unit as set forth in claim 9;
said means to secure said housing including magnet means secured to said housing, said base plate being of a magnetic or magnetically attracted material.

11. A drive unit as set forth in claim 1;
said switching means in said compartment including a rocket arm, a tilt operated switch mounted on said rocker arm, a switch actuator outside of said compartment, and magnet means on said actuator movable toward and away from magnet means on said rocker arm to selectively open and close said switching means.

12. A drive unit as set forth in claim 1;
said switching means in said compartment including a pivotally mounted first rocker arm having a center of gravity below the pivot of said rocker arm, a tilt operated switch mounted on said first rocker arm, a magnet means on said arm on each side of said pivot means, a switch actuator rocker arm outside of said compartment, said switch actuator rocker arm having magnet means at opposite ends thereof adjacent to and generally overlying the magnet means on said first rocker arm, the respective overlying magnet means being of opposite polarity.

13. A drive unit as set forth in claim 1;
said switching means in said compartment including a pivotally mounted rocker arm having a tilt operated switch mounted thereon, said rocker arm having magnet means on opposite sides of said pivot, said means being of the same polarity;
a switch actuator outside of said compartment rotatable about an axis extending transversely of said rocker arm, said switch actuator having spaced magnet means adjacent to and generally overlying said rocker arm magnet means, one of said spaced magnet means on said actuator being of opposite polarity to that of the other of said means.

14. A drive unit as set forth in claim 1;
said switching means in said compartment including a pivotally mounted rocker arm having a tilt switch thereon and having first and second magnet means on opposite sides of said pivot, said magnet means being of the same polarity; and
a switch actuator outside of said compartment but adjacent said rocker arm, said switch actuator including a third magnet means slidable from a position generally overlying said second magnet means, said third magnet means being of opposite polarity to said first and second magnet means.

References Cited

UNITED STATES PATENTS

| | | | |
|---|---|---|---|
| 1,371,267 | 3/1921 | Shelton | 310—91 |
| 2,077,181 | 4/1937 | Morse | 310—91 |
| 2,521,723 | 9/1950 | Hubbell | 335—207 |
| 2,843,698 | 7/1958 | Knauth | 335—207 |
| 3,074,347 | 1/1963 | Clymer | 310—98 |
| 3,168,661 | 2/1965 | Rini | 310—68 |
| 3,270,165 | 8/1966 | Gariepy | 335—54 |
| 3,350,585 | 10/1967 | Maynard | 310—68 |
| 3,400,286 | 9/1968 | Anastasio | 310—98 |

FOREIGN PATENTS

| | | |
|---|---|---|
| 626,418 | 7/1949 | Great Britain. |
| 853,732 | 11/1960 | Great Britain. |

ORIS L. RADER, Primary Examiner

LESTER L. HEWITT, Assistant Examiner

U.S. Cl. X.R.

200—168; 310—68, 88, 103; 335—205